(12) United States Patent
Prabhu et al.

(10) Patent No.: US 11,572,846 B2
(45) Date of Patent: Feb. 7, 2023

(54) SYSTEM AND METHOD TO CALIBRATE AN ENGINE CONTROL UNIT (ECU) OF A VEHICLE

(71) Applicants: ROBERT BOSCH GMBH, Stuttgart (DE); BOSCH LIMITED, Bangalore (IN)

(72) Inventors: Panduranga Prabhu, Bangalore (IN); Anantha Prashanth, Bangalore (IN); Pramod Reddemreddy, Bangalore (IN); Bijith Thiruvappallil Gangadharan Pillai, Kerala (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 476 days.

(21) Appl. No.: 16/467,117

(22) PCT Filed: Dec. 6, 2017

(86) PCT No.: PCT/EP2017/081647
§ 371 (c)(1),
(2) Date: Jun. 6, 2019

(87) PCT Pub. No.: WO2018/114329
PCT Pub. Date: Jun. 28, 2018

(65) Prior Publication Data
US 2019/0316539 A1    Oct. 17, 2019

(30) Foreign Application Priority Data
Dec. 21, 2016 (IN) .............................. 201641043689

(51) Int. Cl.
*F02D 41/24* (2006.01)
*F02D 41/26* (2006.01)
(Continued)

(52) U.S. Cl.
CPC ....... *F02D 41/2432* (2013.01); *F02D 41/266* (2013.01); *G01M 17/0072* (2013.01); *G01M 15/04* (2013.01)

(58) Field of Classification Search
CPC .............. F02D 41/2432; F02D 41/266; G01M 17/0072; G01M 15/04
See application file for complete search history.

(56) References Cited

U.S. PATENT DOCUMENTS

| | | | |
|---|---|---|---|
| 7,047,125 B1 * | 5/2006 | He ...................... | F02D 41/2432 701/111 |
| 2002/0018982 A1 * | 2/2002 | Conroy .................. | G09B 19/16 434/62 |

(Continued)

FOREIGN PATENT DOCUMENTS

| | | |
|---|---|---|
| CN | 204439365 U | 7/2015 |
| WO | 2013/172011 A1 | 11/2013 |

OTHER PUBLICATIONS

International Search Report corresponding to PCT Application No. PCT/EP2017/081647, dated May 14, 2017 (5 pages).

*Primary Examiner* — Kurt Philip Liethen
(74) *Attorney, Agent, or Firm* — Maginot, Moore & Beck LLP

(57) ABSTRACT

The system is provided to calibrate the ECU of the vehicle. The system comprises a remote computer, a central server, a local computer and setup comprising at least a dynamo meter, and at least one actuator. The dynamo meter and the actuator are interfaced and operated with the local computer. The central server is connected to the local computer by a second networking means, and a remote computer is connected to the central server by a first networking means. The remote computer, uploads instructions to the central server, executes the instructions through the local computer to operate the dynamo meter and the actuator, and calibrates (Continued)

the ECU of the vehicle. The instructions are downloaded to the local computer by the second networking means.

12 Claims, 5 Drawing Sheets

(51) Int. Cl.
*G01M 17/007* (2006.01)
*G01M 15/04* (2006.01)

(56) References Cited

U.S. PATENT DOCUMENTS

| | | | |
|---|---|---|---|
| 2008/0264149 A1 | 10/2008 | Hazelton et al. | |
| 2014/0331752 A1 | 11/2014 | Hall et al. | |
| 2016/0131067 A1* | 5/2016 | Romba | F02D 41/28 701/115 |
| 2016/0281845 A1* | 9/2016 | Pietron | F16H 61/061 |
| 2017/0169629 A1* | 6/2017 | Sugihara | G07C 5/0808 |
| 2020/0294401 A1* | 9/2020 | Kerecsen | G05D 1/0287 |

\* cited by examiner

SYSTEM AND METHOD TO CALIBRATE AN ENGINE CONTROL UNIT (ECU) OF A VEHICLE

This application is a 35 U.S.C. § 371 National Stage Application of PCT/EP2017/081647, filed on Dec. 6, 2017, which claims the benefit of priority to Serial No. 201641043689, filed on Dec. 21, 2016 in India, the disclosures of which are incorporated herein by reference in their entirety.

FIELD OF THE INVENTION

The present disclosure relates to a system to calibrate an Engine Control Unit (ECU) of a vehicle. More particularly, relates to the system and method to calibrate the ECU remotely through cloud services on subscription basis.

BACKGROUND OF THE INVENTION

A delivery of a software/instructions for calibration of a vehicle (such as a series software, a development software) is presently done through E-Mail or through separate server for each customer. When a new software is introduced, the customer has to be trained on the changes and calibration process for the same. Each customer performs calibration in different methods. An expert calibration engineer has to go to customer location often, to do part or complete calibration of different functionalities of the vehicle.

The calibration of Engine Management System (EMS) or Engine Control Unit (ECU) takes place in the dynamometer. The dynamometer is either an engine dynamometer or a chassis dynamometer. The ECU comprises complex functionalities. There are a lot of MAPS and curves available in the ECU. The MAPs/Curves must be calibrated with accurate values to get the desired performance out of the engine. Presently most of the calibration activities in the chassis dynamometer is done manually. It requires a lot of test iterations which results in increased development time and cost. It requires a lot of effort for verification of calibration and preparation of the report. Most of the process have to be repeated if any improvement is required.

The vehicle operating points has to be changed frequently as the calibration goes on. When the drive cycle measurements are done, a human driver drives the vehicle on the dynamometer. To match the required vehicle driven point, the driver controls the throttle, clutch, gear and break manually. The accuracy of test result depends on the human error. Throttle position, gear, clutch, break, dynamometer rotary speed and dyno blower speed are to be controlled. Manually controlling these parameters requires a lot of attention and time. Most of the time the accuracy and reproducibility are less.

Hence, there is a need for a system which provides a common platform for calibration services, enabling exchange of automated calibration instructions and results of calibration. Further, there is a need for the system to automate the calibration of the ECU of the vehicle.

BRIEF DESCRIPTION OF THE ACCOMPANYING DRAWINGS

An embodiment of the disclosure is described with reference to the following accompanying drawings, FIG. 1 illustrates a system to calibrate an ECU of a vehicle, according to an embodiment of the present invention;

DETAILED DESCRIPTION OF THE EMBODIMENTS

Figure 1:
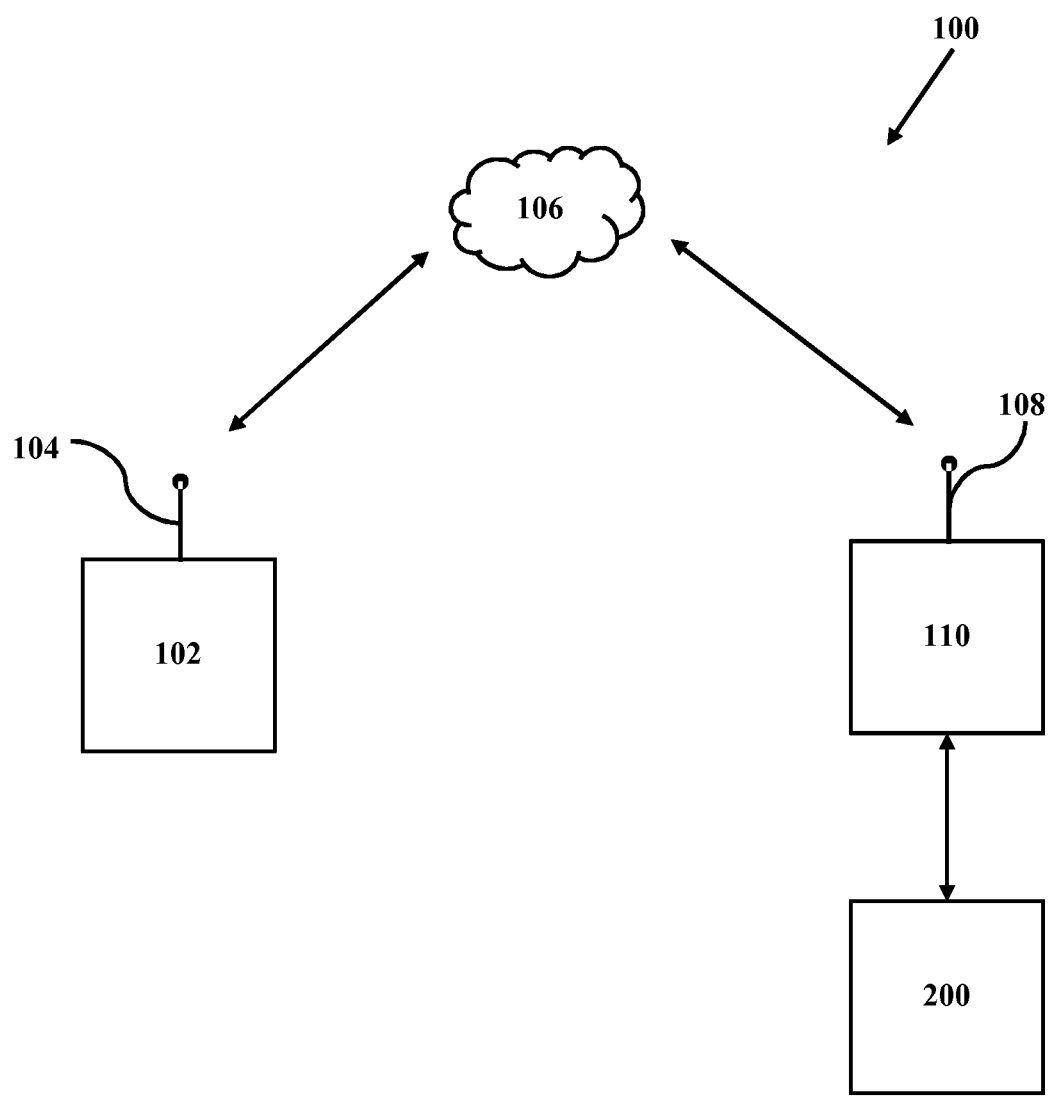
Figure 2:
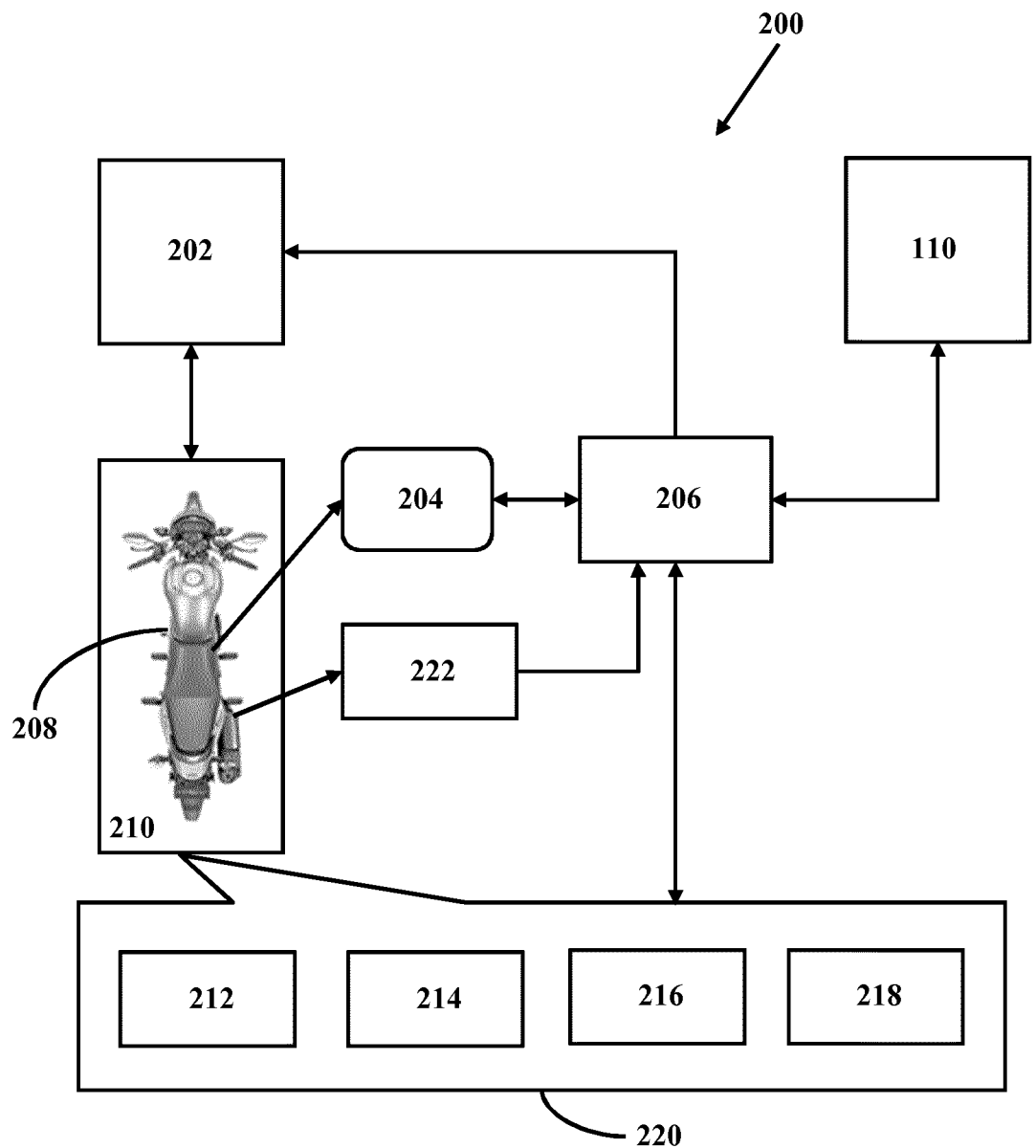
FIG. 2 illustrates an setup required for ECU calibration, according to an embodiment of the present invention.

FIG. 1 illustrates a system to calibrate an ECU of a vehicle, according to an embodiment of the present invention. The system 100 enables calibration of the ECU 204 of the vehicle 208 as shown in FIG. 2. The system 100 comprises a remote computer 102, a central server 106, a local computer 110 and a setup 200 comprising at least a dynamometer 210, and at least one actuator 220. The setup 200 is also shown in FIG. 2. The dynamometer 210 (also referred to as dyno) and the actuator 220 are interfaced and operated with the local computer 110. The central server 106 is connected to the local computer 110 by a second networking means 108, and a remote computer 102 is connected to the central server 106 by a first networking means 104. The remote computer 102, uploads instructions to the central server 106, executes the instructions through the local computer 110 to operate the dynamometer 210 and the at least one actuator 220, and calibrates the ECU 204 of the vehicle 208. The instructions are downloaded to the local computer 110 through the second networking means 108. The instructions are provided as scripts (program) for each of the at least one actuator 220.

The remote computer 102 controls the setup 200 remotely, or the local computer 110 controls the setup 200. The first networking means 104 and the second networking means 108 are selected from a group comprising a wired or wireless network such as Local Area Network (LAN), Wireless Local Area Network (WLAN) and the like. Further, the setup 200 is allowed to use different communication networks for calibration comprising Controller Area Network (CAN), Universal Asynchronous Receiver/Transmitter (UART), an Inter-Integrated Circuit (I2C), a Serial Peripheral Interface (SPI), a FlexRay and the like.

The remote computer 102 further displays result of the calibration by accessing the central server 106. The result of the calibration are uploaded by the local computer 110 to the central server 106 after end of the calibration. The result comprises reports and log files related to the calibration of the ECU 204.

The system 100 is provided to or accessed by a user as a Subscription as a Service (SaaS). Both the remote computer 102 and the local computer 110 access the central server 106 through a user interface. The remote computer 102 is the host and the local computer 110 is the client. In accordance to an embodiment of the present invention, the remote computer 102 is used by the service provider to upload scripts to the central server 106. The local computer 110 is accessed by the client or customer to download the scripts/instructions for performing calibration of the ECU 204.

FIG. 2 illustrates a setup required for ECU calibration, according to an embodiment of the present invention. The setup 200 is provided to automate the calibration of the ECU 204 of the vehicle 208. The setup 200 enables automatic control of vehicle and engine operating points by the local computer 110. The setup 200 comprises a dynamometer 210 i.e. either an engine dynamometer or a chassis dynamometer. The setup 200 further comprises plurality of sensors 222 such as Manifold Air Pressure (MAP) sensor, a Throttle Position Sensor (TPS), a Crank and/or a Cam position and speed sensor, a coolant temperature sensor, an air temperature sensor, an Exhaust Oxygen (Lambda) sensor and the like. The setup 200 still further comprises a dyno controller 202 to operate the dynamometer 210, and a communication interface 206 such as a Controller Area Network (CAN) interface to enable communication between the local computer 110 and the dyno controller 202, the ECU 204, the actuator 220, the sensors 222 and the like.

In accordance to an embodiment of the present invention, the actuator 220 is selected from a group comprising a throttle actuator 212, a brake actuator 214, a gear actuator 216, a clutch actuator 218, a fuel injection module (not shown), a blower (not shown) and the like. Each actuator 220 comprises a control unit having a microcontroller flashed with actuator program. Considering the communication interface 206 to be a CAN transceiver, the CAN transceiver transmits and receives the CAN message from the CAN bus. A stepper motor or other motor or other electro-mechanical assembly is used in the actuator 220. A driver circuit for the stepper motor is provided which is controlled by the control unit.

In accordance with an embodiment of the present invention, the remote computer 102 selectively uploads and executes instructions corresponding to said plurality of actuators 220 as selected by the client. Based on the required calibration, the instructions or scripts of the actuator 220 which is required/requested by a client/customer/end user, only those is/are provided for ECU calibration. For example: If calibration is required only with respect to throttle, then scripts, for operating only the throttle actuator 212 is uploaded to the central server 106. Once uploaded, only that specific script is accessible by the client through the local computer 110. Only the subscribed scripts is accessible by the client. Further, the client pays only for the subscription (such as time based, usage based, etc.).

For calibration and measurement activities, the communication interface 206 having more than one communication channels are used to reduce the complexity. Such as in the CAN transceiver, one CAN channel is used to communicate to the vehicle ECU 204. The other CAN channel is used to communicate to the actuator 220. So an additional CAN interface between the local computer 110 and actuator 220 is avoided. Further, a dedicated database is generated for the actuator 220. The instructions are written to control the actuator 220 as the calibration progresses. The scripts sends messages with proper message ID to the actuator 220 (according to the database of the actuator 220). Then the actuator 220 is operated and a closed loop control is achieved by checking the actual position/ response by the corresponding sensor 222.

The dyno controller 202 controls the roller speed of the dynamometer 210 to maintain required vehicle speed/engine speed. The blower controller (not shown) controls a cooling fan in the dynamometer 210 to maintain the required engine temperature. At every point of the calibration of the ECU 204, the at least one actuator 220 is operated automatically by local computer 110 provided with instructions. The instructions coordinates the automated calibration.

The remote computer 102 is provided or loaded or installed with executable instructions or scripts for each calibration process required for the vehicle 208. The instructions are distributed to customers through central server 106. To enable calibration, the standardized setup 200 is formed.

The central server 106 such as a cloud based server, is established to distribute the scripts to the customer on subscription basis. The customer is charged based on the subscription. The calibration scripts generates reports and log files during the execution. At the end of the calibration activity, the reports and logged data is uploaded back to the central server 106. The reports are used for the analysis and review for diagnostics. The delivery of updated calibration scripts to customers are made through the central server 106 as a continuous process. The scripts are periodically updated and subscribers or customers are provided with the access as per the subscription.

In another embodiment of the present invention, the calibration of the ECU 204 is customer guided. Once the calibration scripts are downloaded at the local computer 110, the scripts guides the user/operator to perform or adjust or operate the dynamometer 210 or the at least one actuator 220 to carry out the calibration process. During guided calibration, the system 100 may prompt the user to change the ECU parameter as well.

According to another embodiment of the present invention, a device to calibrate an Engine Control Unit (ECU) 204 of the vehicle 208 is provided. The vehicle 208 is positioned on at least one roller of a dynamometer 210, and is operated with at least one actuator 220. The dynamometer 210 and the at least one actuator 220 are interfaced with the device. The device is further adapted to connect to a central server 106 through a second networking means 108, download instructions from the central server 106, execute the instructions to operate the dynamometer 210 and the at least one actuator 220, and calibrate the ECU 204. The device uploads result of the calibration back to said central server 106 for analysis. The device is the local computer 110.

According to another embodiment of the present disclosure, a system 100 is provided to calibrate the ECU 204 of the vehicle. The system 100 comprises the remote computer 110, the central server 106, the dynamometer 210 and at least one actuator 220. The at least one actuator 220 comprises a built-in processor or controller which directly receives the instructions/ scripts from the central server 106. The use of the local computer 110 is avoided. The scripts uploaded by using the remote computer 110 directly controls the at least one actuator 220. The ECU 204 of the vehicle is calibrated directly by using the remote computer 102.

Figure 3:
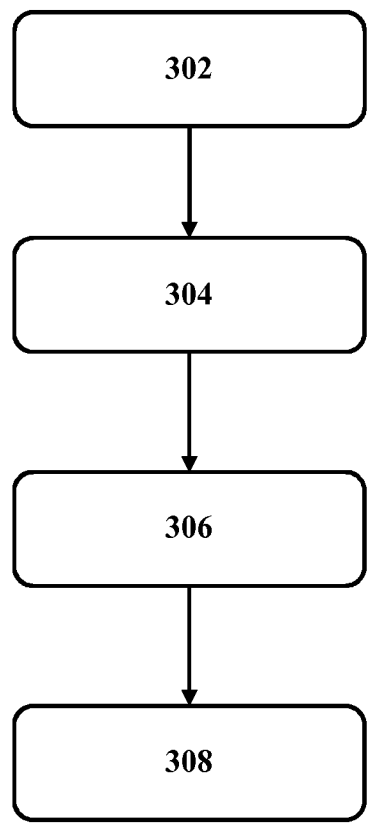
FIG. 3 illustrates a flow diagram of a method for calibrating the ECU of the vehicle.

FIG. 3 illustrates a flow diagram of a method for calibrating the ECU of the vehicle. The vehicle 208 is operated by a dynamometer 210 and at least one actuator 220 through a local computer 110. A step 302 comprises connecting the remote computer 102 to the local computer 110 through the central server 106. A step 304 comprises uploading instructions to the central server 106 through the remote computer 102. A step 306 comprises executing the instructions through the local computer 110 for calibrating the ECU 204.

The method further comprises uploading result of the calibration to the central server 106 followed by displaying the results in the remote computer 102. The method is any one of an automatic process and a guided process by a user/customer intervention.

Figure 4:
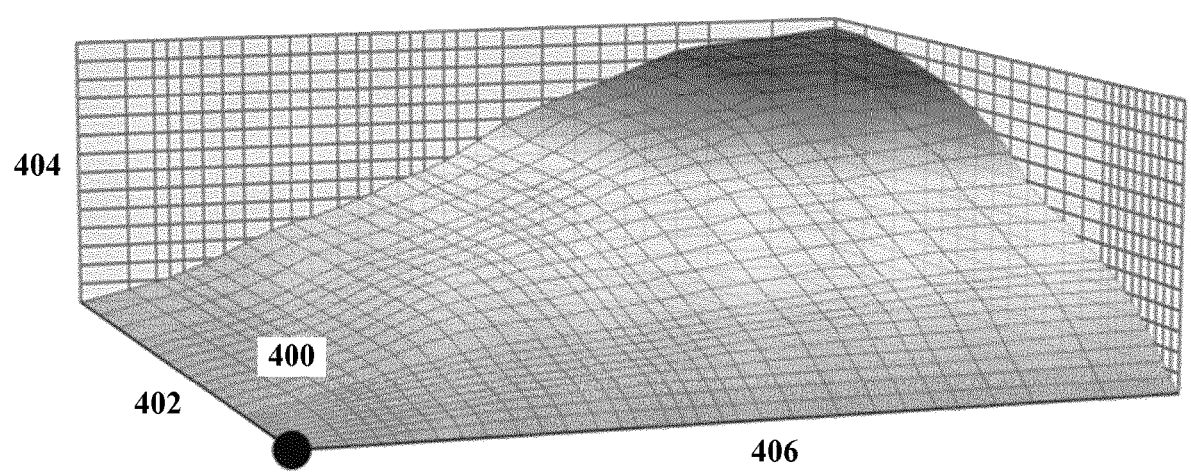
FIG. 4 illustrates a map used during calibration of air charge distribution, according to an embodiment of the present invention.

FIG. 4 illustrates a map used during calibration of air charge distribution, according to an embodiment of the present invention. The map 400 is for estimating real mass flow over a throttle valve. The map 400 is shown with three axes. The X-axis 402 corresponds to throttle position having different set-points. The Y-axis 406 represents engine speed. The Z-axis 404 represents air charge. In accordance to an embodiment of the present invention, to calibrate the map 400, an electronically controlled throttle actuator 212 is provided. The throttle actuator 212 is operated by the local computer 110 on execution of the instructions. The throttle actuator 212 is controlled in a manner that the throttle position is set to the first set-point followed by calibration of the point based on engine speed control using the dynamometer 210 and the air charge detection by the MAP sensor.

To calibrate the map 400, the vehicle 208 is brought to each set-point based on a coordinate point on X-axis 402 and Y-axis 406 by controlling the throttle and engine speed by the throttle actuator 212 and the dynamometer 210, respectively. The dynamometer 210 is switched to constant velocity mode for calibration and correspondingly the throttle actuator 212 is operated to get the desired throttle position. The value of TPS is read from the ECU 204 for a closed loop control of throttle. Then dynamometer 210 is controlled to bring the vehicle 208 to the target engine speed. The engine speed is read from ECU 204. Simultaneously, the engine temperature is monitored. If the engine temperature is out of range, then the blower is switched ON to control the engine temperature. Then the calibration at that point is carried out. After the calibration of first set-point, the next set-point is selected and the suitable actuators 220 are operated to bring the engine/vehicle to that point.

The process is repeated for all the set-points. After the calibration of the map 400, the calibrated map 400 is again verified with respect to all set-points. The throttle actuator 212 is also controllable for transient calibration where the throttle position is shifted between two set-points in a quick manner. The automatic or electronic control of the throttle actuator 212 provides an easy and less time consuming system 100. Otherwise, the user needs to set all the set points with manual throttle control followed by verification of the map 400 resulting in decreased accuracy and increased time of calibration.

In accordance to an embodiment of the present invention, a brake actuator 214 is provided. The map 400 is adjusted to different points along with application of breaks at different intensity to execute certain test cases.

In accordance to an embodiment of the present invention, the at least one actuator 220 is operated either as a standalone mode or automatic mode. In the standalone mode, the actuator 220, is operated independently providing good accuracy. The actuator 220 is controlled by means of a knob or through the local computer 110, or by means of push buttons.

In automatic mode, the actuator 220 is connected to the existing calibration tools. The actuator 220 does not require any input from the user. The actuator 220 is controlled automatically according to the calibration in progress. The communication is through communication interface 206. The actuator 220 is allowable to be controlled manually as well, by entering the desired position in the local computer 110. So during calibration and verification, the actuator 220 is controlled automatically and quickly. The required position is maintained with less tolerance.

Figure 5:
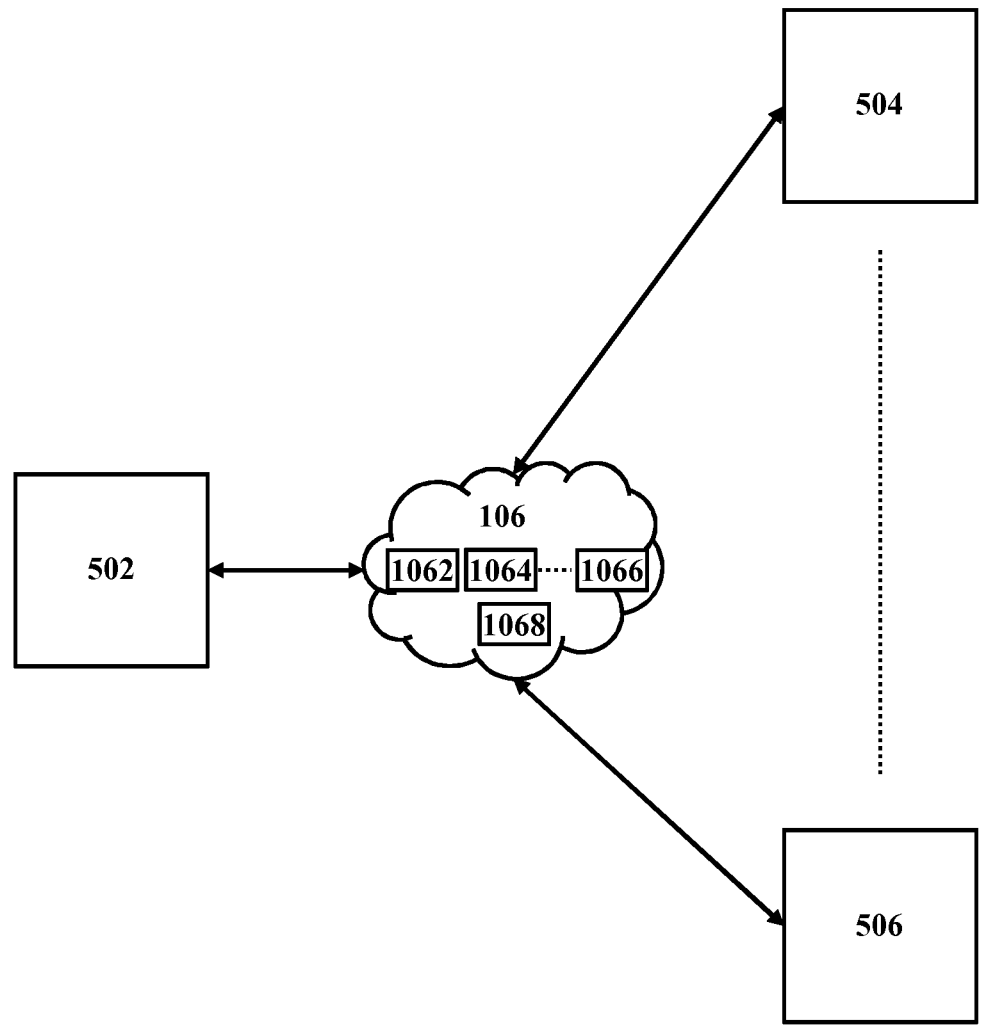
FIG. 5 illustrates a use case of the system, according to an embodiment of the present invention.

FIG. 5 illustrates a use case of the system, according to an embodiment of the present invention. The use case depicts a service provider at first location 502 hosting the calibration service through the central server 106. A client or customer at a second location 504 access the central server 106, after taking subscription of the calibration service from the service provider. The central server 106 comprises plurality of scripts for calibration of different functionalities of the vehicle 208. Here the service provider generates and uploads the calibration scripts 1062, 1064 . . . 1066 to the central server 106. Each customer is provided with the subscription to their specific scripts. The results 1068 comprising reports and logs uploaded from the customer site at second location 504 is used for review purpose. The customer is charged based on the subscription. Similarly, a customer from a third location 506 is also allowed to use the central server 106 for calibration activities.

In accordance to an embodiment of the present invention, a standardized process is provided, which enables easy analysis and troubleshooting. With the availability of the instructions, the customers/ users are able to perform the calibration process without having the expertise. The actuator 220 is plug and play type. The development cost and time is significantly reduced. The system 100 also gives better reproducibility and performance. Whole calibration activity is automated. Manual intervention is optional and may not be required. The setup 200 automates the manual interventions and makes the calibration process efficient. The system 100 is also possible to be used for calibration of the ECU 204 within the same premise or building or location, in which case the host and the end user are same. The system 100 is applicable for different types of vehicles 208 such as motorcycle, scooter, cars, quads, and the like.

It should be understood that embodiments explained in the description above are only illustrative and do not limit the scope of this invention. Many such embodiments and other modifications and changes in the embodiment explained in the description are envisaged. The scope of the invention is only limited by the scope of the claims.

We claim:

1. A system for calibrating an Engine Control Unit (ECU) of a vehicle, the system comprising:
   at least a dynamometer;
   at least one actuator;
   a local computer interfaced with and configured to operate the at least one dynamometer and the at least one actuator; and
   a remote computer connected to the local computer through a central server by a first networking device and a second networking device, the remote computer being configured to:
   upload instructions to the central server;
   execute the instructions through the local computer to operate the dynamometer and the at least one actuator; and
   calibrate the ECU.

2. The system as claimed in claim 1, wherein the remote computer is further configured to:
   display a result uploaded to the central server, the result being uploaded to the central server by the local computer after an end of the calibration.

3. The system as claimed in claim 1, wherein the at least one actuator includes at least one of a throttle actuator, a brake actuator, a gear actuator, a clutch actuator, and a fuel injection module.

4. The system as claimed in claim 1, wherein the remote computer is further configured to:
   selectively upload and execute instructions corresponding to the at least one actuator based on a selection by a client.

5. A method for calibrating an Engine Control Unit (ECU) of a vehicle, the vehicle being operated by a dynamometer and at least one actuator through a local computer, the method comprising:
   connecting a remote computer to the local computer through a central server;
   uploading instructions to the central server with the remote computer; and executing the instructions with the local computer to calibrate said ECU.

6. The method as claimed in claim 5 further comprising:
uploading a result of the calibration to the central server with the local computer; and
displaying the result with the remote computer.

7. The method as claimed in claim 5, wherein the method is performed in at least one of an automatic process and a guided process through a user intervention.

8. A device for calibrating an Engine Control Unit (ECU) of a vehicle, the vehicle being positioned on at least one roller of a dynamometer and being operated with at least one actuator, the dynamometer and the at least one actuator being interfaced with the device, device being configured to:
connect to a central server through a second networking device;
download at least one instruction from the central server;
execute the at least one instruction to operate the dynamometer and the at least one actuator; and
calibrate the ECU.

9. The device as claimed in claim 8, wherein the device is further configured to:
upload results of the calibration to the central server for analysis.

10. The device as claimed in claim 8, wherein the device is a local computer.

11. The system of claim 1, wherein the local computer includes a communication interface that enables communication with the dynamometer.

12. The system of claim 11, wherein the communication interface enables communication over a CAN network.

* * * * *